United States Patent [19]

Arbjerg

[11] Patent Number: 4,671,747
[45] Date of Patent: Jun. 9, 1987

[54] CONTROL DEVICE FOR HYDROSTATIC POWER ASSISTED STEERING

[75] Inventor: Niels Arbjerg, Sønderborg, Denmark

[73] Assignee: Danfoss A/S, Nordborg, Denmark

[21] Appl. No.: 829,787

[22] Filed: Feb. 14, 1986

[30] Foreign Application Priority Data

Feb. 14, 1985 [DE] Fed. Rep. of Germany ....... 3504993

[51] Int. Cl.[4] .......................... F03C 2/08; B62D 5/083
[52] U.S. Cl. ............................... 418/61 B; 91/375 R; 91/467; 137/625.24
[58] Field of Search ............... 418/61 B; 60/384, 386; 91/375 R, 467; 137/625.24; 180/132

[56] References Cited

U.S. PATENT DOCUMENTS

| | | | |
|---|---|---|---|
| 2,984,215 | 5/1961 | Charlson | 418/61 B |
| 3,360,932 | 1/1968 | Lech et al. | 91/467 |
| 3,438,200 | 4/1969 | Jennings et al. | 60/386 |
| 3,819,307 | 6/1974 | Uppal | 418/61 B |
| 3,880,554 | 4/1975 | Termansen et al. | 418/61 B |
| 3,953,158 | 4/1976 | Uppal | 418/61 B |
| 4,050,474 | 9/1977 | Morgan | 418/61 B |
| 4,109,679 | 8/1978 | Johnson | 60/384 |

FOREIGN PATENT DOCUMENTS 2253532  5/1974  Fed. Rep. of Germany .... 91/375 R
1446879  8/1976  United Kingdom .

*Primary Examiner*—John J. Vrablik
*Attorney, Agent, or Firm*—Wayne B. Easton

[57] ABSTRACT

The invention relates to a hydrostatic power steering unit of the type having a gerotor gear set forming a metering motor and a valve unit for routing pressurized fluid from an inlet port selectively via expansible chambers of the gerotor gear set to either one of two motor ports while connecting the other one of the motor ports to an outlet port. The housing of the valve unit, which has inner and outer rotary sleeve members, is arranged adjacent the gerotor gear set. A cardan shaft which connects the outer sleeve member to the gerotor star member has a gear head connected to the adjacent end of the outer sleeve member but the shaft itself is disposed mostly in the gerotor star member. The bore of the inner sleeve member has a smaller diameter than that of the shaft head connected to the outer sleeve member and the annularly and axially extending valving grooves of the inner valve member may thus have relatively greater radial depths and thereby relatively greater capacity.

9 Claims, 7 Drawing Figures

CONTROL DEVICE FOR HYDROSTATIC POWER ASSISTED STEERING

The invention relates to a control device for hydrostatic power assisted steering, particularly for vehicles, comprising a gear train which includes a measuring motor and comprises a stationary internally toothed gear ring and a rotating and planetating externally toothed gear, and a valve arrangement which forms a distributing valve for the measuring motor and forms a directional valve and comprises a housing bore with distributing orifices, an outer rotary slide therein with control orifices, and an inner rotary slide with control grooves, the inner slide having a coupling for connection to a steering element and the outer slide being connected by way of a first coupling to rotate with a first head of a cardan shaft of which the second head at the other end engages in the gear and is connected to rotate therewith by way of a second coupling.

Known control devices of this kind work so that, by turning the inner rotary slide, the directional valve defined between the two slides is opened, the liquid flowing to the steering motor is first led through the measuring motor and the latter makes the outer slide follow depending on the amount of throughflow. A distributing valve is formed between the outer slide and the housing bore and it connects the compression chambers of the gear train in the correct sense to the pressure side of the control device and the supply side of the steering motor. The gear train is provided near the end oF the valve arrangement. The eardan shaft extends through a bore in the inner slide and at the end remote from the gear train it is connected by the first coupling to the outer slide.

The invention is based on the problem of providing a control device of the aforementioned kind suitable for larger power steering without substantially increasing the cross-sectional dimensions.

According to the invention, this problem is solved in that the axial length of the gear train is at least approximately equal to the length of the cardan shaft, that the first coupling connects the first head to a part of the outer rotary slide adjacent to the gear train, and that, for the purpose of increasing the depth of at least part of the control grooves, the cross-sectional projection of the inner rotary slide overlaps the cross-section of the first head in the region of its largest diameter.

By axially elongating the gear train, more pressure medium can be fed to the steering motor on full control because the compression of the measuring motor per revolution is proportional to the axial length. However, since a larger throughflow also leads to larger pressure drops and therefore losses, the throttling resistances in the valve arrangement have also been reduced. For this purpose, the inner rotary slide extends inwardly so far that the control grooves can be given a greater depth, i.e. the available flow section is adapted to the larger throughflow. This is possible because the cardan shaft no longer has to pass through the entire inner slide; there is sufficient space for it within the gear. On the whole, therefore, the pressure drop can be kept at permissible levels despite the greater amount of flow.

In an extreme case, the inner rotary slide could be solid. Generally, however, it is advisable for the inner rotary slide to have at its end facing the gear train a central recess for receiving at least part of the first head and, adjoining thereto, a bore of smaller diameter than the largest diameter of the first head. The axial length of the recess need only be such that the first head of the cardan shaft can be coupled to the outer rotary slide. As is usual, the bore can then serve to discharge low pressure fluid.

Preferably, the diameter of the bore of the inner slide is at least 20% smaller than the largest diameter of the first head.

Favourable results are obtained if the base of the control grooves lies on a diameter which is no more than about equal to the largeat diameter of the first head.

In a preferred embodiment, at least some of the control orifices of the outer slide cooperating with axial grooves of the inner slide have an axial length longer than the circumferential width. This not only increases the cross-sections of the axial grooves but also those of the control orifices, so that the throttling resistances at this point can also be kept low.

In a further embodiment of the invention, the width of the control orifices feeding the distributing orifices and the control angle between the inner and outer slides are so large that these orifices communicate with the control grooves over at least ⅔ of their width in the limiting positions corresponding to full valve opening. In this way, one obtains a sufficiently large cross-section at least for those parts of the directional valve between which the measuring motor and the distributing valve are connected. Even if in this case the conrol orifices interconnect adjacent control grooves in the neutral position, this is unimportant for operation because the other parts of the directional valve are closed.

In particular, the control angle should be larger than ±12°. This value is larger than the usual control angles and is particularly recommended for control orifices which are axially longer than they are wide because every increase in angle in relation to a circular control orifice brings about a marked increase in area.

In another embodiment, the outer rotary slide has at the outer circumference to both sides of the control orifices feeding the distributing orifices an annular groove and axial grooves which alternately lead to one and the other annular groove and which, together with the distributing orifices, form the distributing valve. The annular grooves therefore always interconnect similarly operated control grooves. Consequently, all the control orifices are effective for feeding the measuring motor and not only those which happen to be operatively connected to a distributing orifice. This also enables the throttling resistances to be reduced.

This applies particularly when the housing bore likewise has at both sides of the distributing orifices an annular groove disposed opposite to a respective annular groove of the outer rotary slide. This again increases the annular cross-section, which reduces the throttling resistances further.

If the second coupling is a multi-groove coupling with central teeth in an aperture of the gear, it is advisable for the central teeth to extend over only a part of the length of the gear and the aperture elsewhere to have a larger diameter than the diameter of the base of the grooves of the teeth. In this way, the teeth need not be formed over the whole length of the gear which, in the case of production by broaching, gives a conical form. By restricting the teeth to part of the length and the diametral dimensioning of the aperture, the teeth need be broached only over a short distance. The grooves are therefore more accurate and better aligned, which gives higher resistance to wear.

Preferred examples of the invention will now be described in more detail with reference to the drawing, in which.

Figure 1:
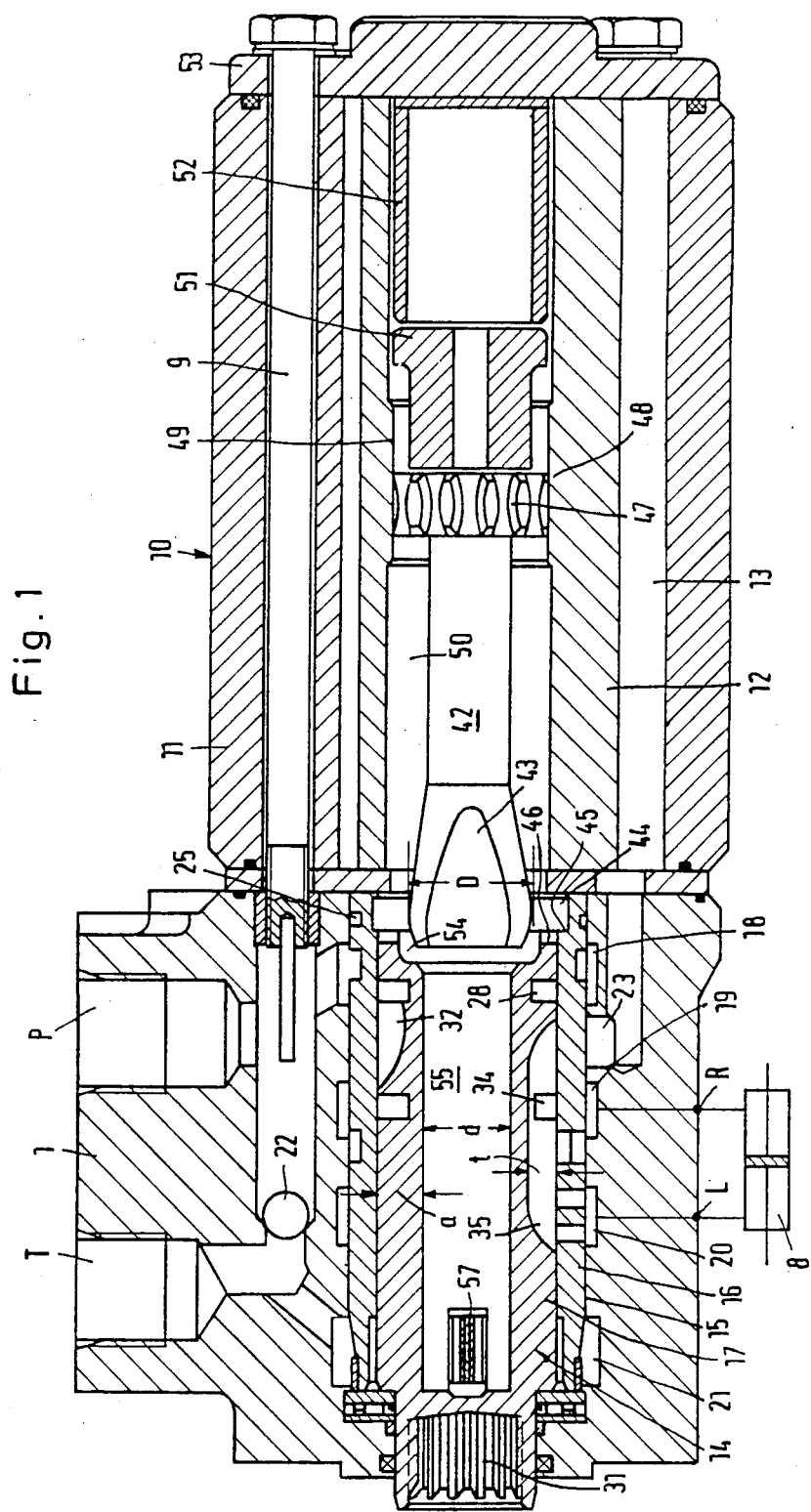
FIG. 1 is a longitudinal section through a control device according to the invention.

The oontrol device of FIG. 1 comprises a valve housing 1 with a connection P for a pump I, a connection T for a tank and two operating connections R and L for a steering motor 8. The connections R and L are only diagrammatically shown. By way of screws 9, there is connected to the valve housing 1 a measuring motor 10 having a gear train consisting of a stationary internally toothed gear ring 11 and a rotating and planetating externally toothed gear 12. The gear 12 has one tooth less than the gear ring 11 so that compression chambers 13 are formed between the teeth.

In the valve housing 1 there is a valve arrangement 14 formed by a housing bore 15, an outer rotary slide 16 and an inner rotary slide 17. In the bore, there are four annular grooves 18, 19, 20 and 21 which are respectively connected to the pump connection P, the operating connection R, the operating connection L and the tank connection T. In the supply line between the pump connection P and annular groove 18 there is a check valve 22. Distributing orifices 23 between the annular grooves 18 and 19 are each connected to a compression chamber 13 of which there are as many as there are teeth in the gear ring 11.

Figure 2:
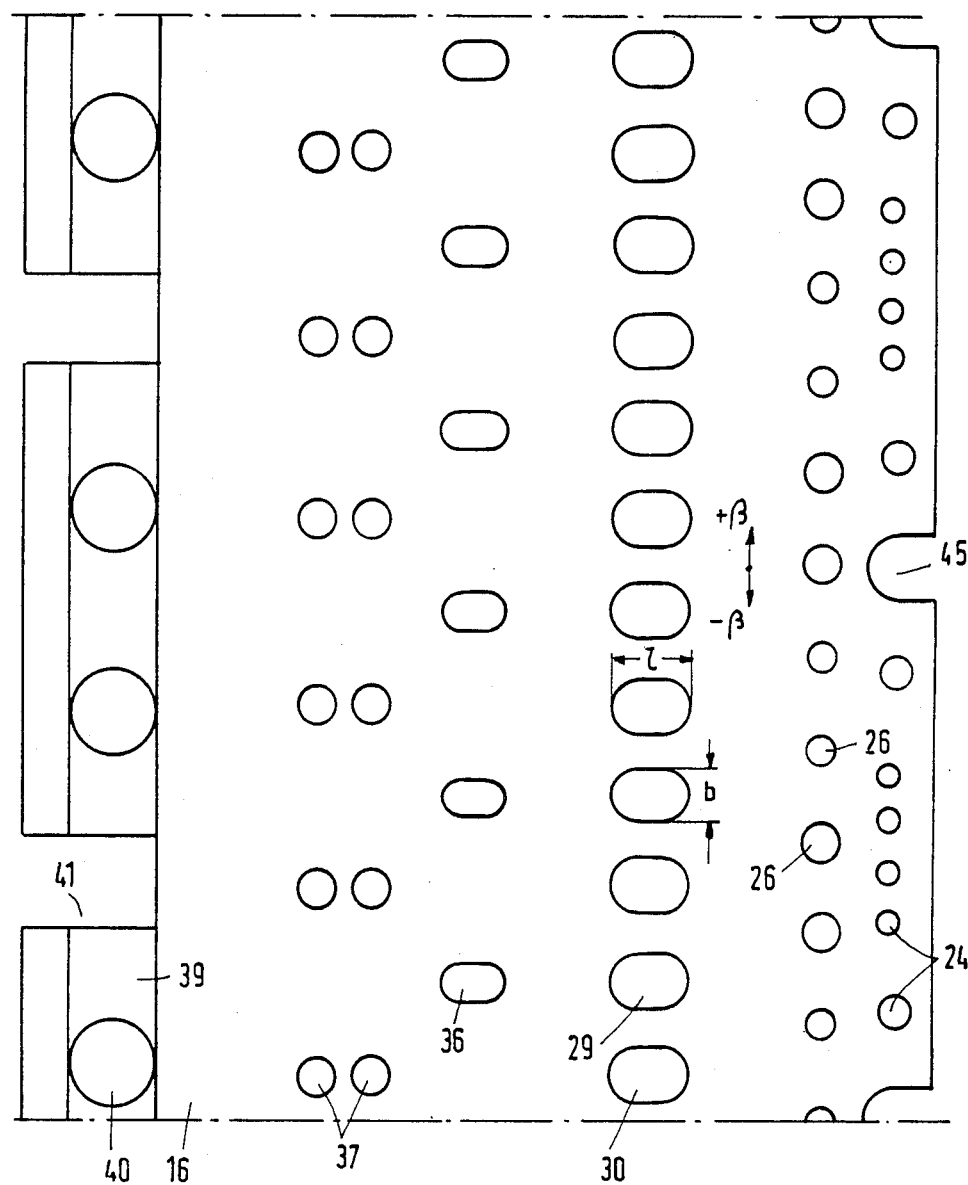
FIG. 2 is a development of the inner circumferential surface of the outer rotary slide with its control orifices.
Figure 3:
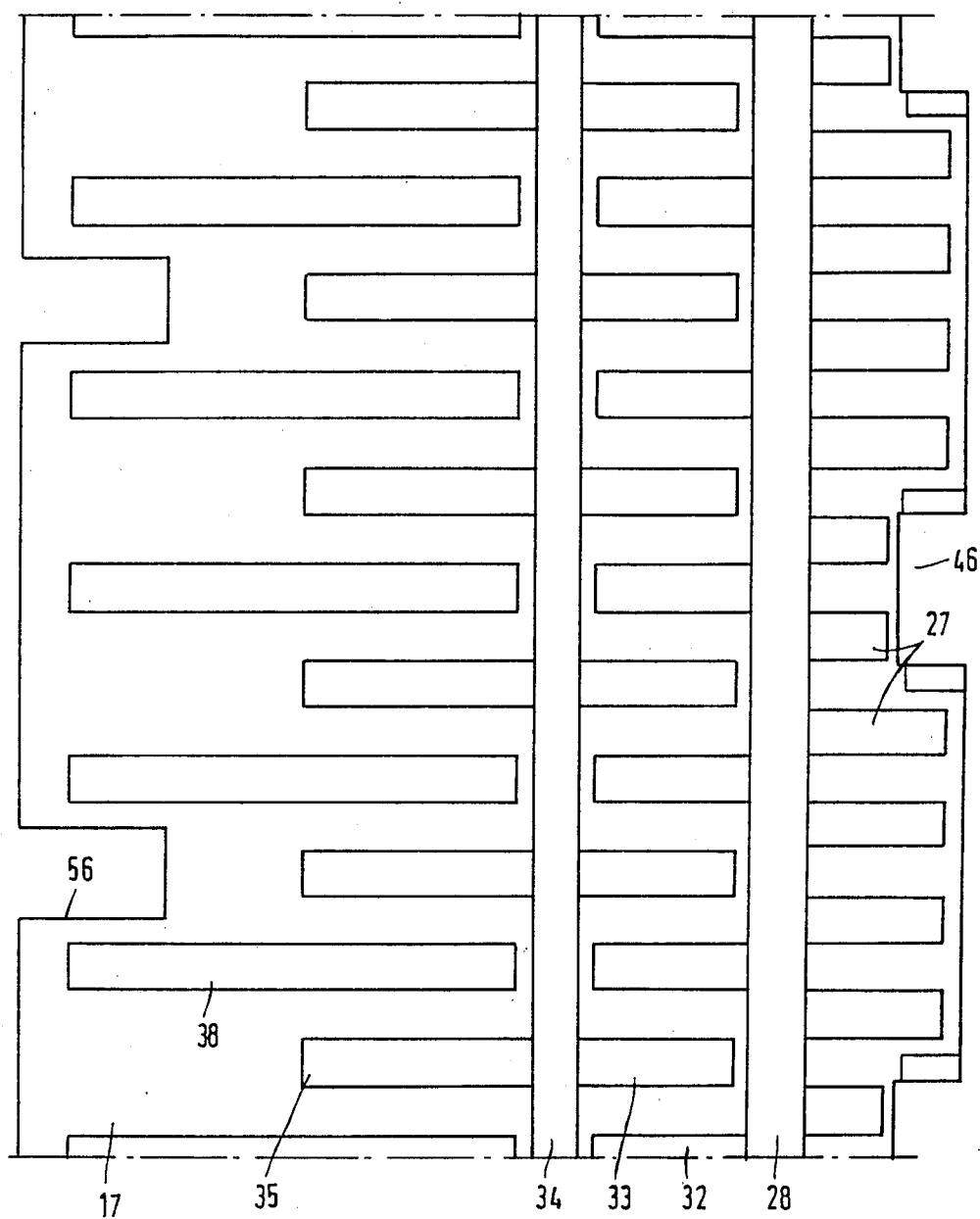
FIG. 3 is the development of the outer circumferential surface of the inner rotary slide with its control grooves.

The outer rotary slide 16 has control orifices and the inner rotary slide has control grooves, these being best shown in FIGS. 2 and 3. Orifices 24 are interconnected on the outside by an annular groove 25 which communicates with a control conduit (not shown) for the load-dependent or "load-sensing" operation. In operation, it contains a load-dependent pressure for controlling the pump pressure and it is relieved towards the tank in the neutral position. Control orifices 26 on the pump side cooperate with axial control grooves 27 to feed pressure Fluid to an annular control groove 28 when the control device is actuated. There follow a series of control orifices 29 and 30 which are associated with the distributing orifices 23 and are provided in the same number as there are teeth in the gear. Depending on the direction of rotation of the steering element engaging the coupling 31 of the inner rotary slide 17, one or the other group of control orifices 29 and 30 comes into communication with the axial grooves 32 at pump pressure. The other group will then communicate with further axial control grooves 33 which, in turn, are interconnected by a second annular control groove 34. Accordingly, the measuring motor 10 is traversed in the one or other direction depending on the direction of rotation. The axial control grooves 35 extending from the annular control groove 34 come into communication with the operating control orifices 36 or 37 depending on the direction of rotation. The respective other operating control orifices will be in communication with the further axial control grooves 38. The latter lead up to an annular groove 39 in the outer rotary slide, which are connected by way of bores 40 and recesses 41 to the annular groove 21 at tank pressure. Depending on the direction of actuation, the steering motor 8 will therefore move in the one or other direction.

A cardan shaft 42 is connected by its first head 43 to the outer rotary slide on the side facing the gear train by way of a coupling 44 formed by a pin. The pin engages in recesses 45 of the outer rotary slide 16 and at the same time passes through recesses 46 in the inner rotary slide 17 of such a circumferential extent that relative motion is possible between the two rotary slides. The second head 47 of the cardan shaft 42 is connected to rotate with the gear 12 by way of a second coupling 48, namely a multi-groove coupling. For this purpose, the gear is provided with teeth 49 over a limited part of its length whilst the remainder of the aperture 50 in the gear has a larger diameter than the base of the grooves of these teeth 49. The axial position of the cardan shaft 42 is determined by inserts 51 and 52 which are held by a cover 53.

For receiving the first head 43 in the interior of the rotary slide 17, only an axially short recess 54 is required. Elsewhere, the inner rotary slide is traversed by a bore 55 having a diameter d less than the largest diameter D of the first head 43. Unpressurised liquid can flow off to the tank by way of this bore, recesses 56 in the inner rotary slide 17 and the recesses 41 in the outer rotary slide 16, which recesses serve to accommodate leaf springs 57 serving as return springs. The cross-sectional projection of the inner rotary slide 17 overlaps the region of largest diameter D of the first head 43. Consequently, one obtains a thick wall thickness a for the inner rotary slide, which permits the depth t of the control grooves 27, 28, 32, 33, 34, 35, 38 to be made much deeper than hitherto.

Figure 4:
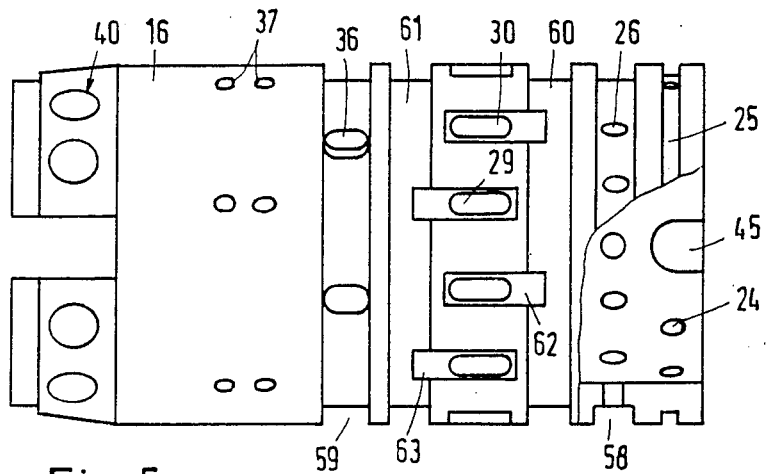
FIG. 4 is a plan view of an outer rotary slide modified from the FIG. 1 embodiment.

The exterior of the outer rotary slide 16 is shown in FIG. 4. It will be seen that the control orifices 26 on the pump side are connected on the outside by an annular groove 58 and the operating control orifices 36 are connected on the outside by an annular groove 59.

In addition to the FIGS. 1 to 3 embodiment, however, provision is made for an annular groove 60 and 61 to be provided to both sides of the control orifices 29 and 30 associated with the distributing orifices. The one group of control orifices is connected to the annular groove 60 by axial grooves 62 and the other group of control orifices is connected to the annular groove 61 by axial grooves 63. These axial grooves, together with the distributing orifices 23, form a distributing valve which cnsures proper feeding of the measuring motor 10. They also ensure in conjunction with the associated annular groove that the active distributing orifices are supplied, i.e. fed or discharged, by all control orifices of one group.

Figure 5:
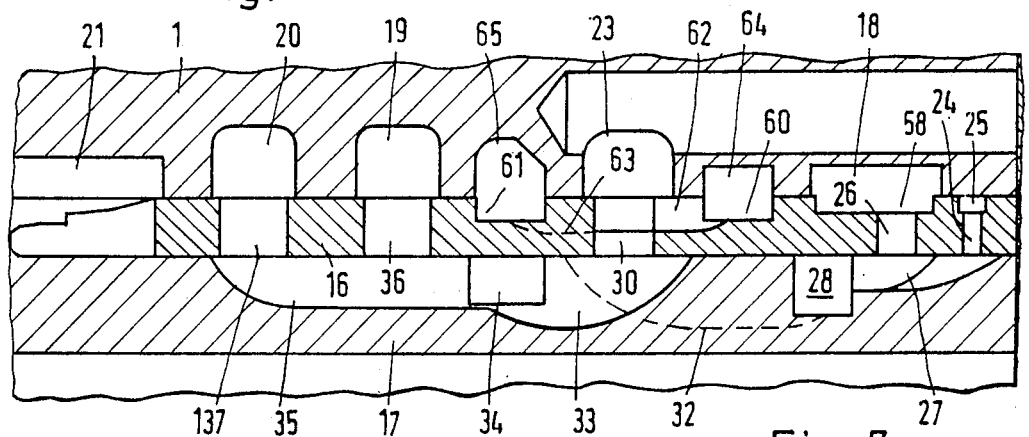
FIG. 5 is a partial longitudinal section through the valve arrangement of the FIG. 4 embodiment.

This is again shown in more detail in FIG. 5. The housing 1 is also provided with annular grooves 64 and 65 which supplement the annular grooves 60 and 61 in such a way that a still larger cross-section is obtained By way of modification, the annular groove 59 is omitted and the pairs of control orifices 37 are replaced by a single control orifice 137.

The control orifioes 29 and 30 associated with the distributing orifices 23 have an axial length l which is longer than the width b measured in the circumferential direction. The cross-section of the overlap with the associated axial control grooves 32 and 33 are is thereby enlarged. The width b and the control angle ± are selected so that, in the limiting position, a very large area of overlap F with the axial control grooves 32 and 33 is obtained in the manner shown in FIG. 6. The overlap should be at least so large that ⅔ of the width of the control orifice 30 is exposed. In the illustrated example, a control angle of 13.3° is provided and there is an area F with a width of 75% of the orifice width b.

Figure 7:
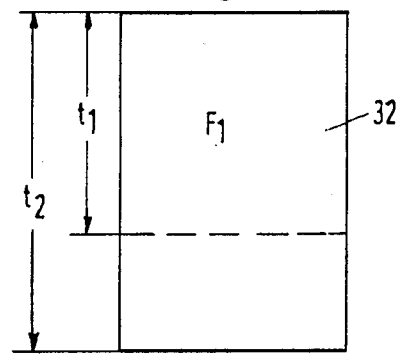
FIG. 7 is a cross-section through a control groove.

FIG. 7 shows the free cross-section F1 of a control groove, for example the groove 32. By reason of the construction, it is possible to increase the depth of the groove from $t_1$ to $t_2$.

Figure 6:
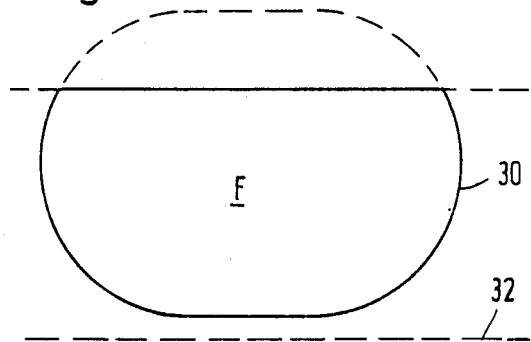
FIG. 6 is a very much enlarged view of a control orifice in the limiting position.

It will be seen from both FIGS. 6 and 7 that considerable cross-sectional enlargements are obtained which permit larger pressure fluid quantities to flow through the control device without larger throttling losses.

In the illustrated control device, the measuring motor 20 has a diameter of less than 10 cm and a compression of 1000 $cm^3$ for each rotation of the gear. The dimensions of the valve housing 1 are correspondingly small. It will be seen that the advantages of low pressure drop apply even if the measuring motor 10 has a lower compression per revolution, i.e. for example when it has only half the axial length of the illustrated motor.

I claim:

1. A hydrostatic power steering unit, comprising, an outer internally toothed ring gear, an inner externally toothed star gear having one less tooth than said ring gear and being in orbital and rotational engagement therewith, said gears forming expanding and contracting chambers therebetween upon relative movement between said gears, a valve unit having a housing in juxtaposition to and attached to said ring gear, said housing having a fluid inlet supply port and a fluid outlet drain port, said housing having a pair of motor ports connectable to opposite sides of a steering motor, said housing having a bore which is coaxial relative to said ring gear, valve means including inner and outer sleeve members rotatably mounted in said bore, said sleeve members having a rotational control angle represented by limited relative rotational movement therebetween for changing valve settings therebetween to effect right and left directional turns via said pair of motor ports, said valve means being operable to connect said fluid supply inlet port selectively via said chambers to either of said motor ports while connecting the other of said motor ports to said fluid outlet drain port, said valve means having cooperating fluid passage means in said housing and said sleeve members (comprising) including axially and annularly extending control grooves in said inner sleeve member and control orifices in said outer sleeve member, said inner sleeve member having coupling means for commection to a steering control member, said star gear having a central bore, a cardan shaft having first and second head membes and being disposed partially in said star gear bore, first coupling means including said first shaft head member connecting one end of said cardan shaft to the adjacent end of said outer sleeve member for rotation therewith, second coupling means including said second shaft head member for connecting the other end of said cardan shaft to said star gear for rotational and orbital movement therewith, said control grooves in said inner sleeve member being axially spaced as a group from said first coupling means, said control grooves in said inner sleeve member extending radially inwardly from the outer circumference of said inner sleeve member to a diameter at least as small as the diameter of said first shaft head member, and the bore of said inner sleeve member being of smaller diameter than said first shaft head member to allow greater depths for said control grooves in said inner sleeve member.

2. A steering unit according to claim 1 characterized in that said inner sleeve member has at its end overlapping said first shaft head member a central recess for receiving at least part of said first shaft head member.

3. A steering unit according to claim 1 characterized in that said diameter of said inner sleeve bore is at least 20% smaller than the largest diameter of said first shaft head.

4. A steering unit according to claim 1 characterized in that the bases of said control grooves lie on a diameter which is no more than equal to the largest diameter of said first shaft head member.

5. A steering unit according to claim 1 characterized in that at least some of said control orifices of said outer sleeve member have axial lengths respectively longer than their circumferential widths.

6. A steering unit according to claim 1 characterized in that said fluid passage means includes distributing orifices in said housing connected to said chambers, said control angle and the widths of certain of said control orifices in said outer sleeve member which are cooperable with said distributing orifices being sufficiently large so that these orifices communicate with corresponding ones of said control grooves in said inner sleeve member over at least two-thirds of their widths in the limiting positions corresponding to full valve opening.

7. A steering unit according to claim 6 characterized in that said control angle is larger than ±12°.

8. A steering unit according to claim 6 wherein said fluid passage means includes distributing orifices in said housing connected to said chambers, said outer sleeve member having annular grooves at the outer circumference on both axial sides of said certain control orifices, and axial grooves which alternately lead to one and the other of said annular grooves.

9. A steering unit according to claim 6 characterized in that said housing bore likewise has at both sides of said distributing orifices annular grooves disposed opposite to said annular grooves of said outer sleeve member.

* * * * *